FIG. I

Nov. 12, 1946. W. H. BRUNS 2,411,023
LOAD WEIGHING DEVICE
Filed April 28, 1945 3 Sheets-Sheet 2

William Henry Bruns INVENTOR

BY Mather E. Bradley ATTORNEY

Nov. 12, 1946.  W. H. BRUNS  2,411,023
LOAD WEIGHING DEVICE
Filed April 28, 1945  3 Sheets-Sheet 3

William Henry Bruns INVENTOR
BY Walter E. B. Bradley  ATTORNEY

Patented Nov. 12, 1946

2,411,023

UNITED STATES PATENT OFFICE 2,411,023

LOAD WEIGHING DEVICE

William Henry Bruns, Lincolndale, N. Y., assignor to Otis Elevator Company, New York, N. Y., a corporation of New Jersey Application April 28, 1945, Serial No. 590,880

7 Claims. (Cl. 265—27)

The invention relates to load weighing devices, especially for weighing the load in elevator cars.

Loading weighing devices for elevators may be utilized for many purposes, for many of which it is desirable to have the load weighed before the car starts. Also load weighing devices are often applied to existing elevator installations so that from the standpoint of manufacture it is desirable that a load weighing device be readily adaptable to both new and existing installations.

One object of the invention is to provide a device for weighing the load on a beam.

A specific object of the invention is to provide a load weighing device for elevators which may be readily applied to new and existing installations, which is of simple and compact construction and which is easily and economically installed, which is adapted for weighing the load in the elevator car before the car starts, and which gives an accurate measurement of the load in the elevator car.

The invention involves weighing the load in an elevator car by measuring the deflection of the supporting cross beam of the framework for the car. The invention will be described as applied to car framework in which the upper cross beam is the supporting cross beam.

In carrying out the invention according to the arrangement which will be described a stiff cantilever is secured at one end to the cross beam as by welding to obviate any lost motion and has its other end free. The deflection of the cross beam relative to the free end of the cantilever is a measure of the load in the car. Load controlled mechanism is provided for operation in accordance with the deflection of the cross beam relative to the free end of the cantilever. To obtain greater movement for operating the load controlled mechanism, an amplifier is interposed between the load controlled mechanism and the free end of the cantilever. This enables a shorter cantilever to be utilized and thus lends to the compactness of the device. The amplifier is made up of two levers, the fulcrum of each of which is formed by reducing the section at the fulcrum point to a minimum. One end of each of these levers is rigidly mounted on the cross beam by welded connections. Also welded joints are provided in the connections from the cantilever to the amplifier, with reduced sections to allow bending and to take care of change in alignments. This construction minimizes friction and eliminates lost motion, thus insuring accurate operation of the load controlled mechanism.

Features and advantages of the invention will become apparent from the following description and appended claims.

Figure 1:
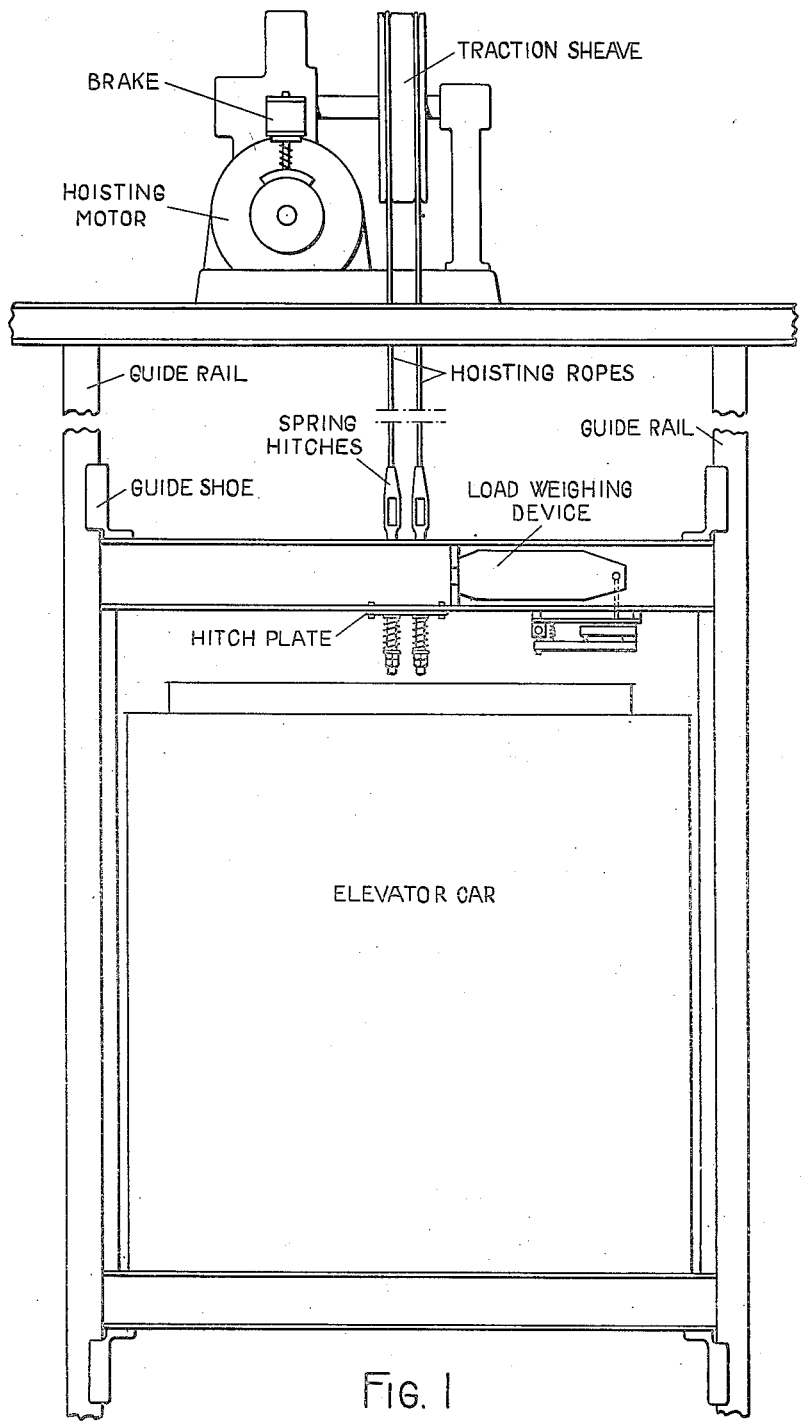
Figure 1 is a simplified schematic representation of an elevator installation embodying the invention.

For a general understanding of the invention, reference may be had to Figure 1 wherein various parts of an elevator installation to which the invention has been applied are indicated by legend. The elevator car is raised and lowered by means of a hoisting motor which drives a traction sheave over which pass the hoisting ropes for the car and counterweight (not shown). For convenience only two hoisting ropes are shown. The electromechanical brake is employed to aid in bringing the motor to a stop and to hold the car while at rest. The hoisting ropes are secured to the car framework by means of spring hitches, the thimble rods of which extend through a hitch plate secured to the bottom of the upper cross beam of the car framework. The guide shoes for the car are secured to the car framework and cooperate with guide rails to guide the car in its upward and downward movement in the hoistway. The load weighing device is secured to the upper cross beam of the car framework. The construction of the load weighing device is more clearly illustrated in the other figures of the drawings.

Figure 2:
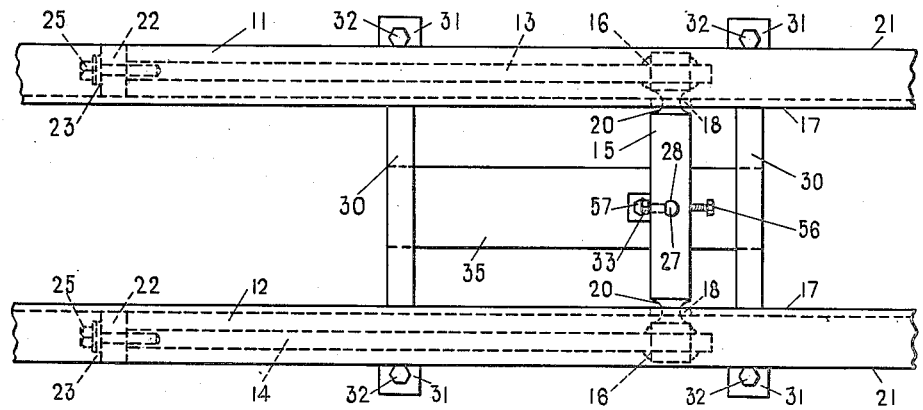
Figure 2 is a top view of a section of the upper cross beam with the load weighing device of Figure 1 mounted thereon.
Figure 3:
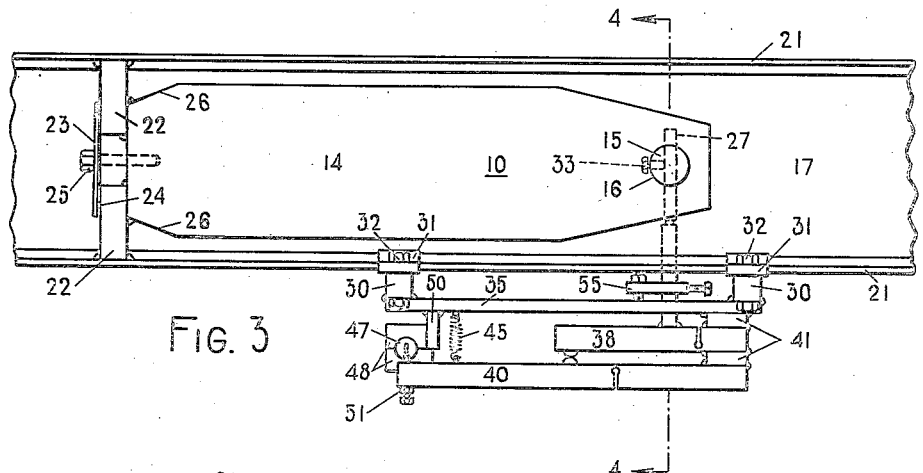
Figure 3 is a side view of the same.
Figure 4:
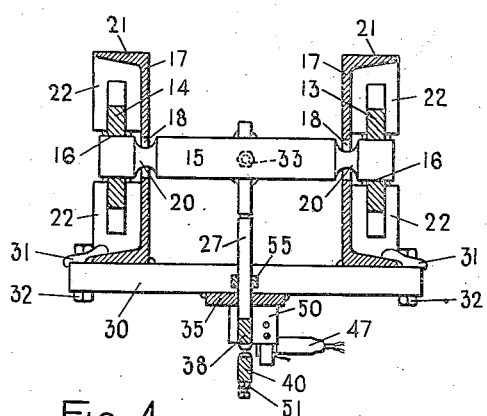
Figure 4 is a view in section taken along the line 4—4 of Figure 3.

Referring now to Figures 2, 3 and 4 the load weighing device comprises a cantilever 10 secured at one end to the upper cross beam with the other end free. The hoisting ropes due to their unequal creepage on the traction sheave may impose unequal loading on the channel members 11 and 12 which form the cross beam. To take care of this unequal loading, cantilever 10 is made up of two cantilever arms 13 and 14, one for each channel member, these arms being positioned in the channels which face outwardly. The cantilever arms at their free ends are joined by a cross bar 15 which is of circular cross section and extends into circular apertures 16 in the ends of the cantilever arms. The webs 17 of the channel members are provided with circular apertures 18 of the same diameter as the cross bar through which the cross bar extends. The portions 20 of the cross bar at the points where it extends through the apertures 18 are of reduced cross section to allow for the deflection of the channel members relative to the cantilever arms upon change in load in the car and to allow bending in case the channel members are unequally loaded.

In securing the cantilever arms to the channel members, the free ends of the arms are supported on a positioning bar (not shown) which has no reduced portions and extends through apertures 16 in the lever arms and the apertures 18 in the channel members. The other ends of the cantilever arms are blocked up with wood blocks to position them midway between the flanges 21 of the channel members. Also the arms are lined up parallel with the webs of the channel members. Mounting blocks 22 shaped to fit the channels are utilized in securing the cantilever arms to the channel members. These blocks are clamped in place fitting the channels and welded both to the channels and the cantilever arms, preferably one block at a time utilizing for each cantilever arm a reversible three point clamp to insure good contact of the blocks with the ends of the arm. This clamp is in the form of a plate 23 having a point contact 24. A screw 25 threaded into the end of the cantilever arm is utilized to clamp the plate against the mounting blocks to hold them in position. The cantilever arms are tapered at 26 to facilitate the welding. When the welding has been completed, the wood blocks and positioning bar are removed. Also the plate 23 and screw 25 may be removed. Securing the cantilever arms to the channel members in this manner insures that the apertures 16 in the free ends of the cantilever arms are aligned to receive the cross bar 15.

After the cross bar 15 has been inserted, the amplifier is mounted on the channel members. The amplifier has a vertically extending operating rod 27 which fits into an aperture 28 in cross bar 15 midway of its ends. The amplifier is mounted on two square bars 30 which span the channel members and are initially secured to the lower legs of the channel members by clips 31 and bolts 32. The amplifier comprises a pair of amplifier levers 38 and 40 which are mounted on a base member 35. The operating rod 27 is secured to the upper amplifier lever 38, extending into a locating pocket formed therein and being welded in place. The base member 35 is welded to bars 30. With the amplifier secured in place a set screw 33 in cross bar 15 is turned to lock the operating rod in position. The cross bar 15 is welded to the free ends of the cantilever arms at the apertures 16 and the rod 27 is preferably welded to the cross bar. Also the bars 30 are welded to the channel members. The clips 31 may then be removed.

Figure 5:
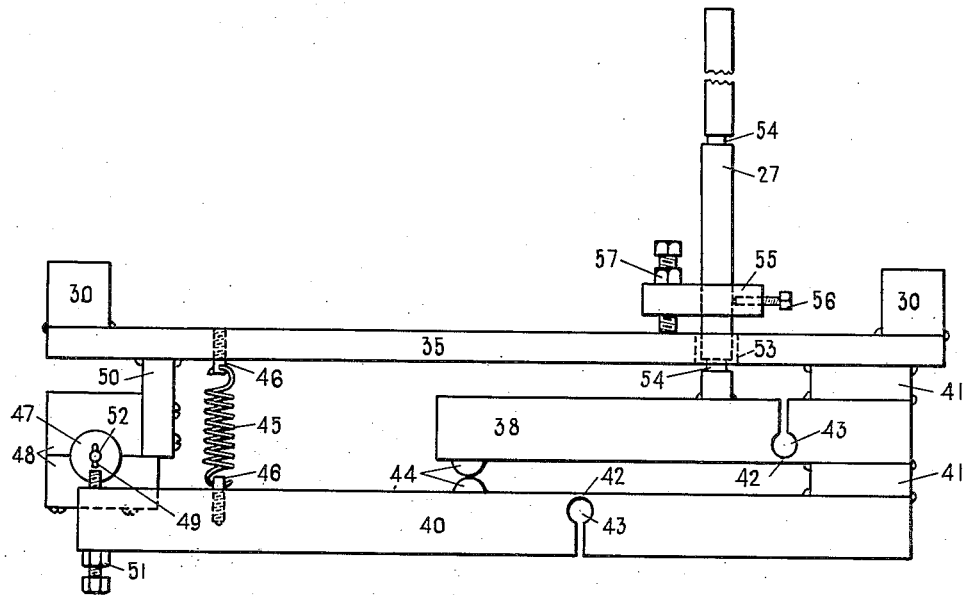
Figure 5 is a detail of the amplifier and load controlled mechanism operated by the load weighing cantilever.
Figure 6:
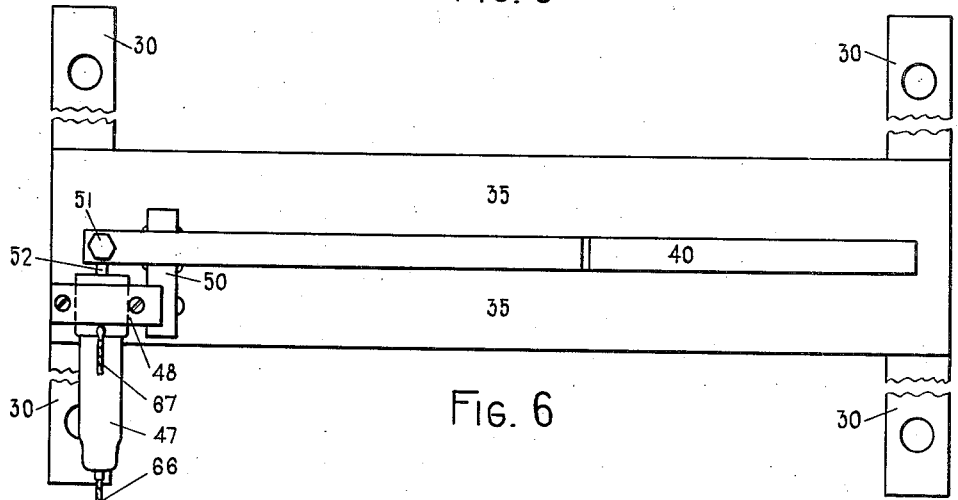
Figure 6 is a bottom view of the same.

Referring now also to Figures 5 and 6, the amplifier levers 38 and 40 are separated from each other and from the base member 35 by spacers 41. The levers are secured together and to the base member by welding them to the lower spacer and by welding the upper spacer to the base member and to the upper lever 38. The fulcrum 42 of each lever is formed by cutting into the lever perpendicularly to its edge to provide a thin bendable section. The cut away space 43 at the thin section is round, being formed by drilling the lever crosswise. Operative contact between the outer end of the upper amplifier lever and the lower amplifier lever is provided by a pair of hardened buttons 44 rigidly secured as by a press fit to the levers. The lower amplifier lever is biased to maintain its contact button engaging the contact button of the upper lever. This is illustrated as effected by a spring 45 extending between base member 35 and the outer end of the lower amplifier lever 40 and connected thereto by adjustable eyebolts 46.

Figure 7:
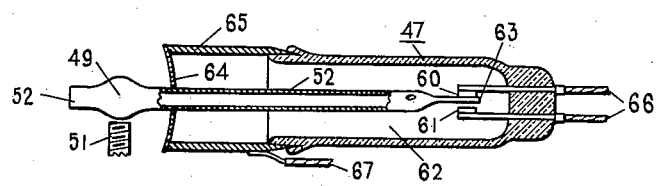
Figure 7 is a view in cross section of a vacuum switch operated by the amplifier.

Load controlled mechanism in the form of a vacuum type switch 47 is mounted on base member 35 in position to be operated by an adjustable screw 51 in the end of the lower amplifier lever 40. Referring to Figure 7, this switch comprises a pair of stationary contacts 60 and 61 arranged in an evacuated envelope 62. A movable contact 63 arranged on the end of an operating arm 52 is biased to engage stationary contact 60. The operating arm 52 is in the form of a hollow tube which passes through a diaphragm 64 at the end of the envelope. The envelope is evacuated through the tube and the portion 49 of the tube is flattened outside the diaphragm to seal off the envelope after the evacuation has been completed. The switch is rigidly secured between clamping blocks 48 around the metallic base portion 65 of the envelope, the blocks in turn being rigidly secured to a block 50 welded to the base member. The switch is positioned so that the edge of the flattened portion 49 of the operating arm is opposite screw 51. This screw has a flat end for engaging the edge of the flattened portion 49, this edge of the flattened portion providing in effect a ball surface. This arrangement insures definite distance between the operating rod and screw and also a fixed lever arm ratio about the fulcrum formed by the diaphragm. Wires 66 are connected to the stationary contacts and a wire 67 is secured to the metallic base portion 65 to form a connection to the movable contact. The engagement of the movable contact with stationary contact 61 when the switch is operated serves as a stop. The amplifier mechanism and switch are provided with a suitable cover, not shown.

The operating rod 27 for the amplifier extends through an aperture 53 in base member 35 and is formed with reduced sections 54 to allow bending. A stop 55 is mounted on the operating rod. This stop is in the form of a short plate through which the operating rod extends and which is secured to the operating rod by set screw 56. An adjustable abutment screw 57 is provided in the end of this plate for engaging base member 35. This stop is adjusted so that the end of the abutment screw just contacts the base member when the car is empty. This stop is for protection of the apparatus in case someone on top of the elevator car should stand on the load weighing arms, cross bar or operating rod.

In operation, upon a load being taken into the elevator car, the channel members 11 and 12 are deflected downwardly about a fulcrum at the spring hitches. This alters the positions of the free ends of the cantilever arms 13 and 14 relative to the channel members. The load measurement is the amount of movement of the channel members at the centers of apertures 18 therein with respect to the center of apertures 16 in the lever arms. As the amplifier is secured to the channel members, this deflection of the channel members causes amplifier lever 38 to be swung clockwise about its fulcrum due to its connection through rod 27 and cross bar 15 to cantilever arms 13 and 14. This produces at the free end of amplifier lever 38 an amplification of the deflection. As this movement of amplifier lever 38 takes place, the lower amplifier lever 40 is swung clockwise about its fulcrum by spring 45, maintaining buttons 44 in contact. This produces at the free end of amplifier lever 40 further amplification of the deflection. When the load in the car becomes a certain amount, dependent upon the adjustment of screw 51, the screw engages operating arm 52 and moves it enough to operate switch 47.

Inasmuch as the deflection obtained per 100 lbs. is small even with amplification, it is desirable to employ a switch which requires a small amount of movement to operate it. Also, it is desirable that the switch construction be such that the difference in position of the end of amplifier lever 40 between opening and closing the switch contacts is minimized. A vacuum type switch has these qualifications. Spring 45 is made only strong enough to lift lever 40 and operate the contacts of the switch. Any increase in load in the car after the operating arm of the switch has been brought to a stop simply results in movement of amplifier lever 38 away from amplifier lever 40.

The load controlled switch may be utilized for various purposes in elevator installations. The contact arrangement of the switch therefore depends upon the use to which the switch is to be put. In certain instances it may be desirable to arrange the circuits controlled by the switch to maintain the load measurement obtained before the car starts until the next stop of the car is made. This obviates the possibility of unwanted operations resulting from acceleration and retardation of the car. If for example the load in the car were near that at which the switch operates, the force due to acceleration of the car in the up direction or retardation in the down direction might cause the switch to operate, thus resulting in a false operation. Similarly if the load in the car had caused the switch to operate, the switch might be returned to unoperated condition due to acceleration of the car in the down direction or retardation in the up direction. However, with the switch cut out upon initiation of the starting of the car, such operations have no effect. The mechanism can not be harmed by forces due to acceleration or retardation as either there is movement of amplifier lever 38 away from amplifier lever 40 or of amplifier lever 40 away from the switch.

Inasmuch as the joinders of the various parts of the load weighing and amplifying parts are effected by welding and the load controlled switch is rigidly secured, any lost motion is eliminated, assuring accurate operation. The arms of the cantilever are made of such wide and thick stock as to be stiff enough substantially to eliminate any bending due to the forces required to operate the switch, thereby assuring a high amplification factor. While the device is especially suitable for weighing the load before the car starts, it may also be utilized for load weighing at other times, as for example just prior to initiation of the stopping operation. Also, the device may be employed to weigh the load on other apparatus, and in fact to weigh the load on beams in general. The device is of simple and compact construction and may be readily installed on both new and existing installations.

While the cantilever arms are illustrated secured to the cross beam at the right of the hoisting ropes, they may be secured at other points, especially where more suitable for the particular installation. While a cantilever of two arms has been illustrated, a single arm may be used, positioned midway between the channel members and secured thereto by one or more cross members welded to the channel members and the cantilever arm. Also, the amplifier may be mounted turned end for end compared with the arrangement illustrated. Other arrangements for providing amplification may be employed such as other forms of mechanical amplification or other types of amplification. Other types of switches may be utilized and while additional contacts may be readily provided by electromagnetic switches controlled by the switch, a switch supplying all the contacts desired may be utilized. Also the switch may be provided with a plurality of contacts arranged for operation in succession as the load in the car increases. Furthermore, other forms of load controlled mechanism than switches may be employed.

Therefore, as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A device for weighing the load in an elevator car the supporting cross beam of the framework for which is formed of spaced cross members, said device comprising; a stiff cantilever having a welded connection at one end to the cross beam in such position that the deflection of the cross beam with respect to the other end of the cantilever is the average deflection of said members; mechanism connected to said cantilever for amplifying said deflection of said cross beam; and load responsive means carried by said cross beam in position to be operated by said amplifying mechanism.

2. A device for weighing the load in an elevator car, the supporting cross beam of the framework for which is formed of spaced cross members, said device comprising; a stiff cantilever having a welded connection at one end to the cross beam in such position that the deflection of the cross beam with respect to the other end of the cantilever is the average deflection of said members; a lever connected to said cantilever for amplifying said deflection of said cross beam; a lever for amplifying movement of said first amplifying lever, each amplifying lever having a thin section serving as a fulcrum and having a welded connection to said cross beam; and load responsive means carried by said cross beam in position to be operated by said second amplifying lever.

3. A device mounted on the upper cross beam of the framework for an elevator car for weighing the load in the car, said device comprising; a pair of stiff arms positioned opposite each other one on each side of the longitudinal center of said cross beam, one end of one of said arms and the corresponding end of the other arm having a welded connection to said cross beam; a cross bar connecting the other ends of said arms; a lever connected to said cross bar for amplifying movement of said cross beam relative to said other ends of said arms; a lever for amplifying movement of said first amplifying lever, each amplifying lever having a thin section serving as a fulcrum and having a welded connection to said cross beam; and load responsive means carried by said cross beam in position to be operated by said second amplifying lever.

4. A device mounted on the upper cross beam of the framework for an elevator car for weighing the load in the car, said device comprising; a pair of stiff arms positioned opposite each other one on each side of the longitudinal center of said cross beam, one end of one of said arms and the corresponding end of the other arm being connected to said cross beam; a cross bar connecting the other ends of said arms; a lever for amplifying movement of said cross beam relative to said other ends of said arms; a lever for amplifying movement of said first amplifying lever, each amplifying lever having a thin section serving as a fulcrum and being connected to said cross beam; a member connecting said cross bar and said first amplifying lever; and translating means carried by said cross beam in position to be operated by said second amplifying lever, all of said connections being welded connections.

5. A device mounted on the upper cross beam of the framework for an elevator car for weighing the load in the car, said device comprising; a pair of stiff arms positioned opposite each other one on each side of the longitudinal center of said cross beam, one end of one of said arms and the corresponding end of the other arm having a welded connection to said cross beam; a cross bar joining the other ends of said arms, said cross bar being welded to said arms; a lever for amplifying movement of said cross beam relative to said other ends of said arms; a lever for amplifying movement of said first amplifying lever, each amplifying lever having a thin section serving as a fulcrum and having a welded connection to said cross beam; a member connecting said cross bar and said first amplifying lever, said member being welded to said cross bar and first amplifying lever; and a switch carried by said cross beam in position to be operated by said second amplifying lever.

6. A device for weighing the load in an elevator car, the upper cross beam of the car framework for which is formed by a pair of spaced channel members, said device comprising; a pair of arms of wide thick stock positioned opposite each other adjacent the channel members, one end of one of said arms and the corresponding end of the other arm having a welded connection to its adjacent channel member and the other end of each arm being free; a cross bar joining the free ends of said arms, said cross bar being welded to said lever arms; a lever for amplifying movement of said channel members relative to the free ends of said arms; a lever for amplifying movement of said first amplifying lever, each amplifying lever having a thin section serving as a fulcrum and having a welded connection to said cross beam; a member connecting said cross bar and said first amplifying lever, said member being welded to said cross bar and first amplifying lever; a small movement switch mounted on said cross beam in position to be operated by said second amplifying lever; and a spring biasing said second amplifying lever in a direction to operate said switch.

7. A device mounted on the supporting cross beam of the framework for an elevator car for weighing the load in the car comprising; a stiff cantilever having a welded connection at one end to the cross beam; a pair of parallel levers one above the other, each having a thin section serving as a fulcrum and having a free end and a welded connection at its other end to said cross beam, one of said levers being positioned so that a point near its fulcrum between its fulcrum and the free end thereof is opposite the free end of the other lever, said one lever being biased for movement about its fulcrum to engage said free end of said other lever at said point on said one lever; means connecting said other lever at a point near its fulcrum between its fulcrum and said free end thereof to the free end of said cantilever to cause upon deflection of said cross beam with respect to said cantilever movement of said free end of said other lever and thus movement of said free end of said one lever to amplify said deflection; and a translating device operable by said free end of said one lever.

WILLIAM HENRY BRUNS.